Aug. 8, 1939.  A. F. TREMBLAY  2,168,833
APPARATUS FOR GATHERING AND FORMING GLASS
Filed Nov. 2, 1936  11 Sheets-Sheet 8

Inventor
Albert F. Tremblay
Owen & Owen
Attorneys

Patented Aug. 8, 1939

2,168,833

UNITED STATES PATENT OFFICE 2,168,833

APPARATUS FOR GATHERING AND FORMING GLASS

Albert F. Tremblay, Toledo, Ohio, assignor to Kent-Owens Machine Company, Toledo, Ohio, a corporation of Ohio Application November 2, 1936, Serial No. 108,691

49 Claims. (Cl. 49—5)

This invention relates to blowing glass, and has particular relation to improvements in apparatus and processes for gathering and blowing glass in a device where the various mechanisms are mounted upon a rotating turret.

One of the objects of the invention is to provide improved means and method for gathering the glass, forming the parison and transferring it to the blow mold.

Another object of the invention is to provide means whereby the blank is accurately shaped and suitably prepared for blowing.

Another object of the invention is to provide means whereby adjustments of various parts may be made with the required accuracy and with a minimum of disturbance of the machine as a whole.

Another object of the invention is to mount the apparatus for rotation about a vertical axis and tilting about a horizontal axis for the purpose of dipping the parison molds into the glass in a new and improved manner.

Other details of the invention will appear as the description proceeds.

The apparatus as a whole relates to that class where blank molds and blow molds are mounted upon a turret rotatable about a central column. In this apparatus the blank molds are mounted stationarily with respect to the turret, except for opening and closing, and the blow molds are mounted in one plane which is above the plane of the parison molds. The parisons are raised upward from the parison molds to a level with the blow molds and the blow molds are moved outward radially and closed about the parisons and then returned to an inward position beneath blow heads where the articles are blown.

One embodiment of the invention is illustrated in the accompanying drawings which form a part of this specification. In those drawings.

The machine shown is mounted upon wheels 20 and 21 which run upon tracks 22 and are connected by shafts 23. Side frames 24 are suspended from shafts 23 by arms 25. Between side frames 24 midway between the wheels, there is a central cross-piece 26. A vertical shaft 27 is mounted in a socket 28 in the cross-piece. On the upper threaded end 29 of shaft 27, there is a nut 30. Links 31 connect nut 30 with the ends of levers 32 and 33.

A base 34 has downwardly projecting brackets 35 which are pivoted upon a shaft 36 which is mounted intermediate between the ends of lever 32, the forked outer end of which is pivoted upon shaft 23. Similarly mounted in lever 33 is a shaft 37, the lever 33 being pivoted at its forked outer end upon the other shaft 23. A supporting ring 38 is mounted upon a ball bearing 39 on shaft 37. A cam 40 on a shaft 41 journaled in base 34 bears upon supporting ring 38. The cam is shown as being integral with the shaft, but obviously might be a separate member mounted on the shaft, and if desired the mounting could be eccentric, to adjust the throw of the cam.

An adjusting motor 42 is mounted upon a bracket 43 pivoted on the central cross-piece 26. The motor drives a chain 44 which in turn drives a worm 45 meshing with a worm wheel 46 fast upon shaft 27. The upper ends of arms 25 are provided with brackets 47 for a purpose which will be described later.

As will be seen, base 34 is supported upon shafts 36 and 37 carried by levers 32 and 33 and when worm 46 is driven by reversible motor 42 in the desired direction, the inner ends of levers 32 and 33 are raised or lowered as desired, thereby determining the elevation of the base.

Upon base 34 on the end over shaft 36, there is a gear box 50, the gearing in which may be driven by a drive wheel 51. A chain 52 or other suitable connection is driven by the gearing within gear box 50 and drives a shaft 53 to operate the gearing within a gear box 54. A shaft 55 driven by the gearing within box 54 projects downwardly therefrom and is provided with a universal joint 56 to take care of any slight lack of exact registry between the gear box and the bearings of shaft 55 in base 34. At its lower end, shaft 55 is provided with a bevel gear 57 meshing with a bevel gear 58 on shaft 59 journaled in the lower side of base 34. At the other end of shaft 59, there is a bevel gear 60 which meshes with a gear 61 on the end of shaft 41 and thereby drives cam 40.

Spur gear teeth 62 are provided upon the flange of gear 20 and mesh with a gear 63. A shaft 64 is mounted in brackets 47 and driven by a crank handle 65.

Figure 2:
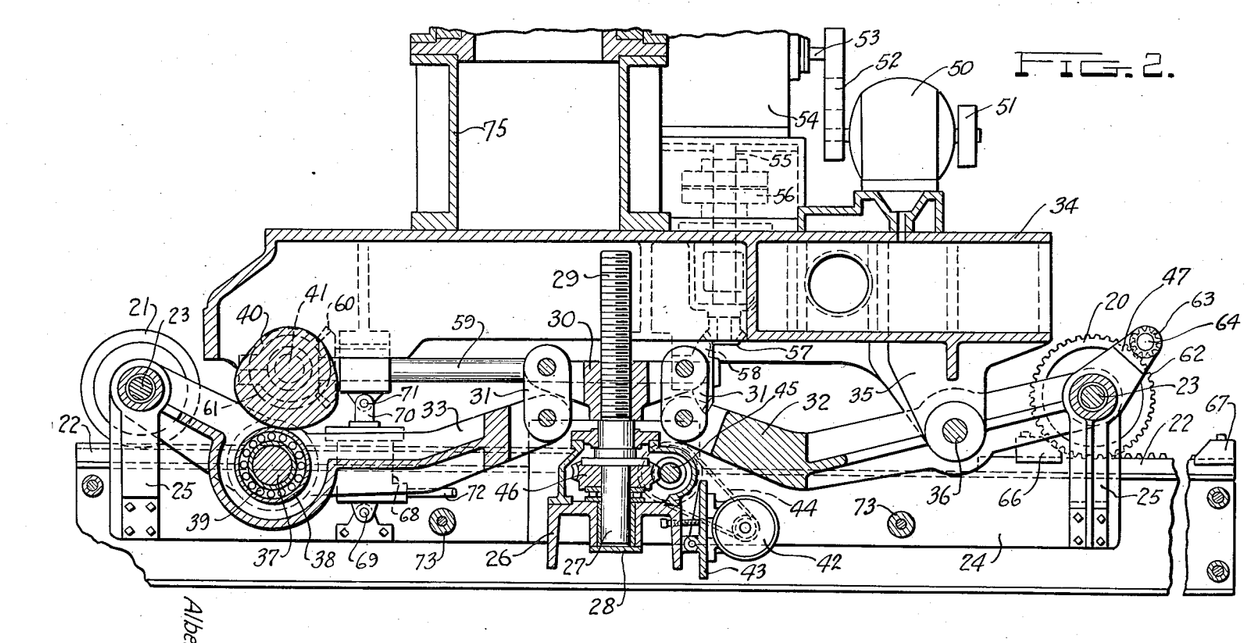
Fig. 2 is a vertical section of the base of the apparatus and lower part of the central column.
Figure 3:
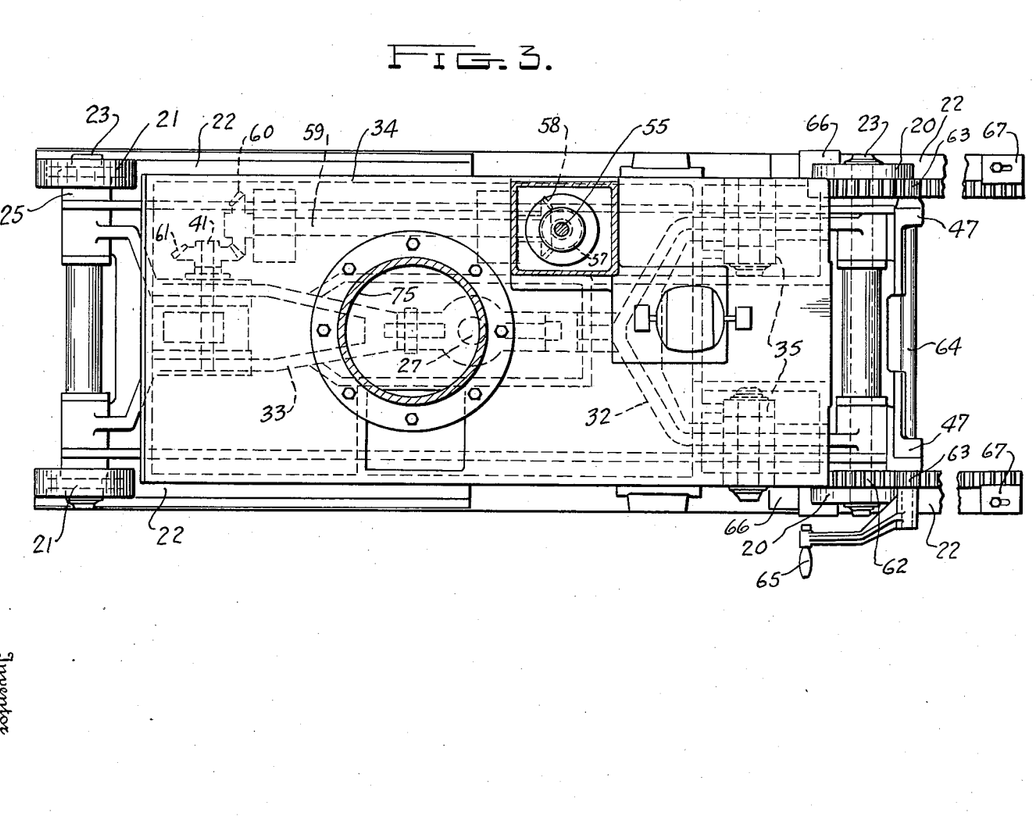
Fig. 3 is a plan view of the parts shown in Fig. 2, parts appearing in section.
Figure 4:
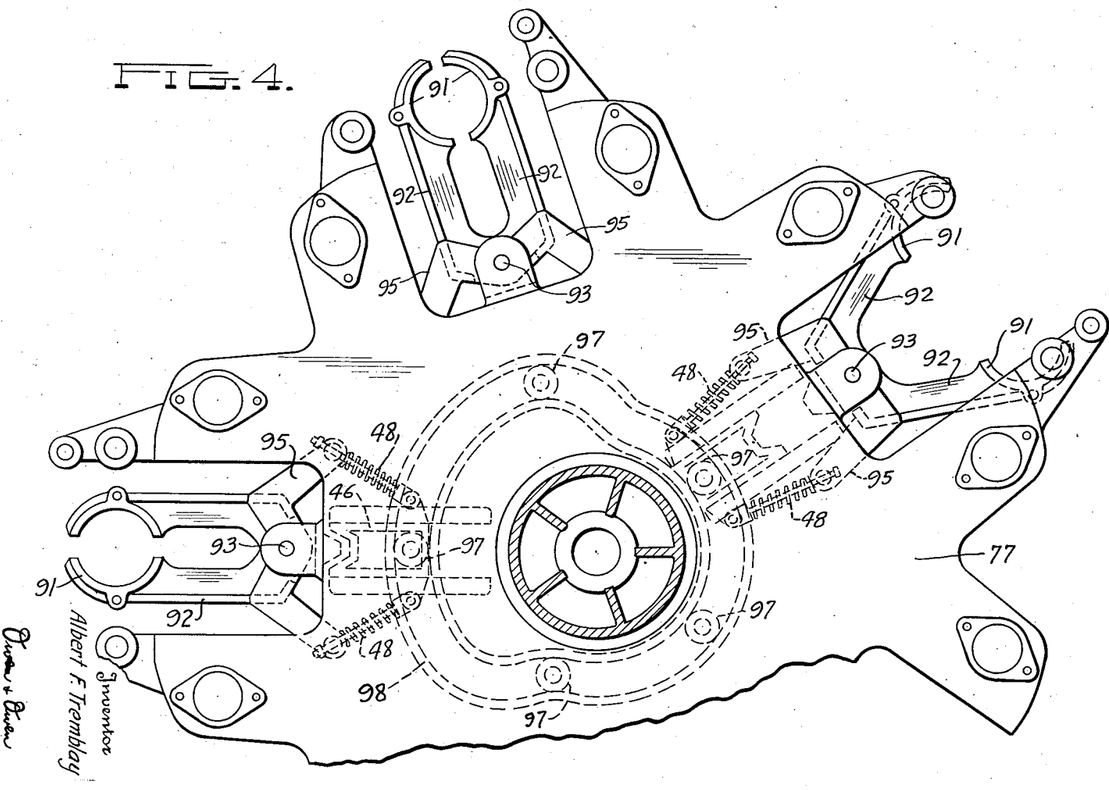
Fig. 4 is a plan view of the means for operating the blank molds, other parts being removed so as to show clearly the operation of the blank mold opening means, parts appearing in section.
Figure 5:
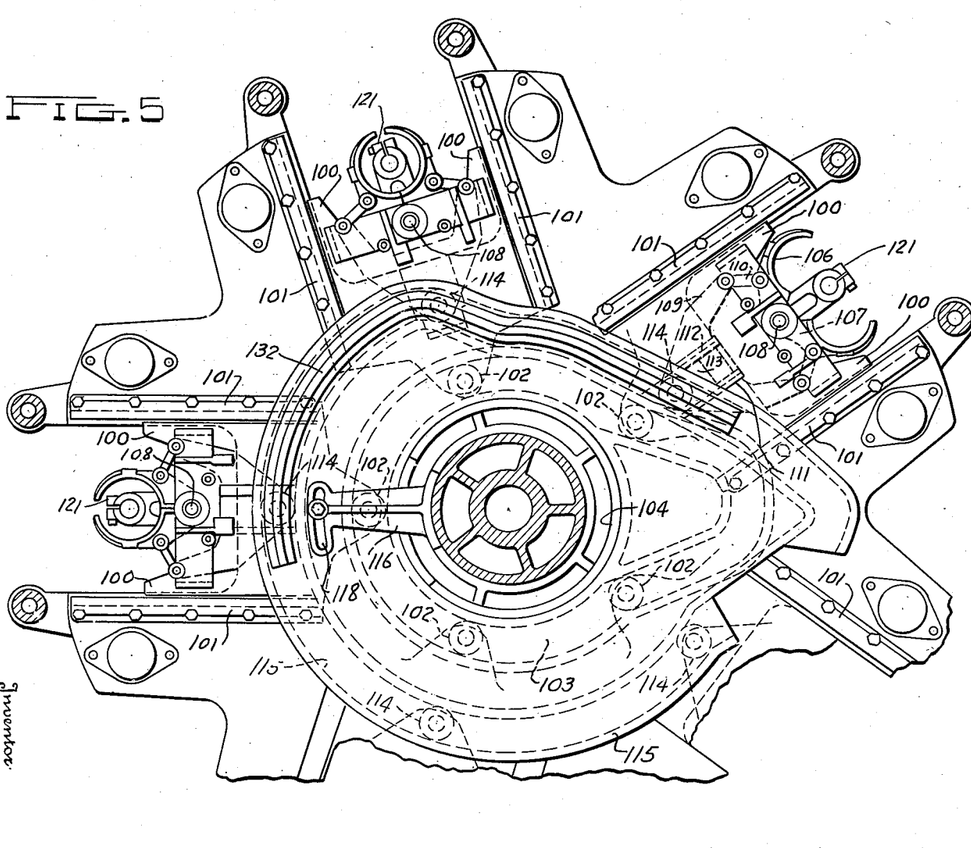
Fig. 5 is a similar view of the means for operating the blow molds, all parts unnecessary for disclosing this operation being omitted, parts appearing in section.

It will be seen that by operating the handle 65, wheels 20 may be driven to move the machine along tracks 22. In the normal operating position of the machine, the wheels 20 ar positioned against stop 66. When desired, the machine is moved away from the glass furnace towards the right end of tracks 22, as shown in Fig. 2, there being provided stops 67 to prevent movement of the wheels beyond the end of the track.

A cylinder 68 is pivoted at 69 upon a side frame member 24. A piston, not shown, within the cylinder is provided with a piston rod 70 pivoted at 71 to the bearing of shaft 59 on the lower side of base 34. The cylinder may be provided with air under pressure through a pipe 72. This cylinder is not necessary, but may be employed, if desired, to support the major portion of the weight of the machine and reduce the lifting force which has to be exerted by cam 40. It will be understood that air under substantially constant pressure is provided through pipe 72 and acts as a continuous lifting force in the cylinder. If desired, the pressure provided through pipe 72 might be varied in timed relation with the operation of cam 40, or it might be used to oscillate the base and the cam could be omitted, but the operation first described is preferred. The side frames may be spaced by rods 73, if desired, so as to keep them in proper lateral position.

Upon base 34, there is mounted the stationary central column 75, the upper end 76 of which is cored out for providing vacuum and air pressure channels as will be described later. Mounted upon the central column there is a lower spider 77 and an upper spider 78 which are connected by posts 79. Above the upper spider there are air control rings 80 from the lower of which rings arms 81 extend to the upper spider.

Upon the lower spider there is mounted drive gear 82 which is in mesh with a gear 83 on the upper end of a shaft 84 driven by the gearing within gear box 54. If desired, this may be the upper end of shaft 55.

Upon the lower spider 77, there are mounted parison molds and blow molds. The blank molds 90 are mounted within holders 91 at the ends of arms 92 pivoted at 93 on the lower spider. The arms extend at 95 beyond the pivot and are connected by yieldable links 48 to a slide 96 provided with a cam roller 97 which bears against a controlling cam 98 upon a cam plate 99 mounted upon the base of the stationary central column.

On the upper side of the lower spider there are mold carrier slides 100 which are movable radially of the spider in slideways 101 therein. Upon each slide there is mounted a cam roller 102 which works within a groove in cam 103 mounted upon a cam drum 104 which in turn is mounted upon the stationary central column above the lower spider. Blow mold halves 105 are mounted in holders 106 on arms 107. The arms 107 are pivoted at 108 upon the slide 100. A fork 109 is connected by links 110 to the mold holding arms. The fork slides upon a support 111 and has therein a slideway 112. Mounted in the slideway 112 there is an operating slide 113 which has mounted thereon a cam roller 114. The cam roller is operated by a groove in cam 115 which is mounted adjustably upon cam drum 104 and also is provided with a supporting arm 116 adjustably mounted in a groove 117 in the stationary column. Cam 115 is connected to arm 116 by a bolt and slot connection 118. A spring 119 is interposed between slide 113 and fork 109 so that the fork is yieldably driven in mold closing direction while it positively moves in the opening direction.

A blow mold bottom 120 is mounted in a carrier 121 pivoted at 122 on slide 100. The carrier 121 is forked and the branches or arms 123 of the fork are mounted upon pivot 122. The arms of the fork rest upon a cross pin 124 which is mounted in the lower end of mold pivot pin 108. The ends of pin 124 slide in vertical slots in ears 125 projecting downward from support 100. Springs 126 normally hold cross pin 124 and mold pivot pin 108 in its upper position. A bell crank lever 127 is pivoted at 128 adjacent the upper end of pin 108. One of the arms 129 of the bell crank lever normally overlies the upper end of pin 108, and the other arm of the bell crank lever carries a cam roller 130 which is operated by a cam 132 mounted upon the upper side of cam plate 115.

A discharge chute 135 is pivoted at 136 to the lower spider. A spring 137 normally tends to swing the chute to a position where it slants outward, the spring holding the chute outward against a stop 138. The chute is provided with an abutment 139 which is adapted to be contacted by an abutting screw 140 upon the gathering head as will be described later.

The gathering head comprises a cross-piece 150 having ears 151 and 152 which slide upon posts 79. A link frame 153 connects the cross head with a lever 154 fulcrumed upon the upper spider at 155. An adjustable link 156 is pivoted at 157 to an upwardly extending arm of lever 154 and is pivoted at 158 to a lever 159 fulcrumed upon the spider at 160. The lower end of lever 159 carries a cam roller 161 which is actuated at proper intervals by a cam 162 carried by a cam drum 104.

The link frame 153 is directly connected to a block 163 attached to the gathering head cross-piece. Beneath the block 163 there is an air control head 164 through which vacuum or air under pressure may be supplied as will be described later. Mounted upon the outer side of head 164 is a pivot 165 for neck ring carriers 166 which carry neck ring halves 167.

These neck ring halves cooperate with a plunger 170 to form the neck of the article. Plunger 170 is removably mounted upon a vertically reciprocable rod 171 which is pivoted at 172 to a link 173 which in turn is connected to a piston rod 174 slidably mounted in a cross-piece 175 between the side members of the link frame 153. The upper end of rod 174 is connected to a piston 176 within a cylinder 177 which may be supplied with air under pressure by means which will be described later. Upon rod 174 beneath cylinder 177 there is affixed a collar 178, and a spring 179 between cross-piece 175 and collar 178 normally urges the piston rod upward. The pivot 172 is in line with the pivotal connection 180 of link frame 153 to block 163 when the plunger is in its lowered position.

Upon carriers 166 there are mounted ears 181 having therein slots 182. Pins 183 extending downward from slide bars 184 work in the slots to swing the neck mold carriers about the pivot 165. Slide bars 184 are connected by rods 185 and 186. To the ends of rods 185 there are connected tension springs 187 normally urging the bars in the direction to close the neck ring. One of the springs 187 is mounted in the plate 188 on block 163, which plate carries abutment screw 140 mentioned above.

Figure 1:
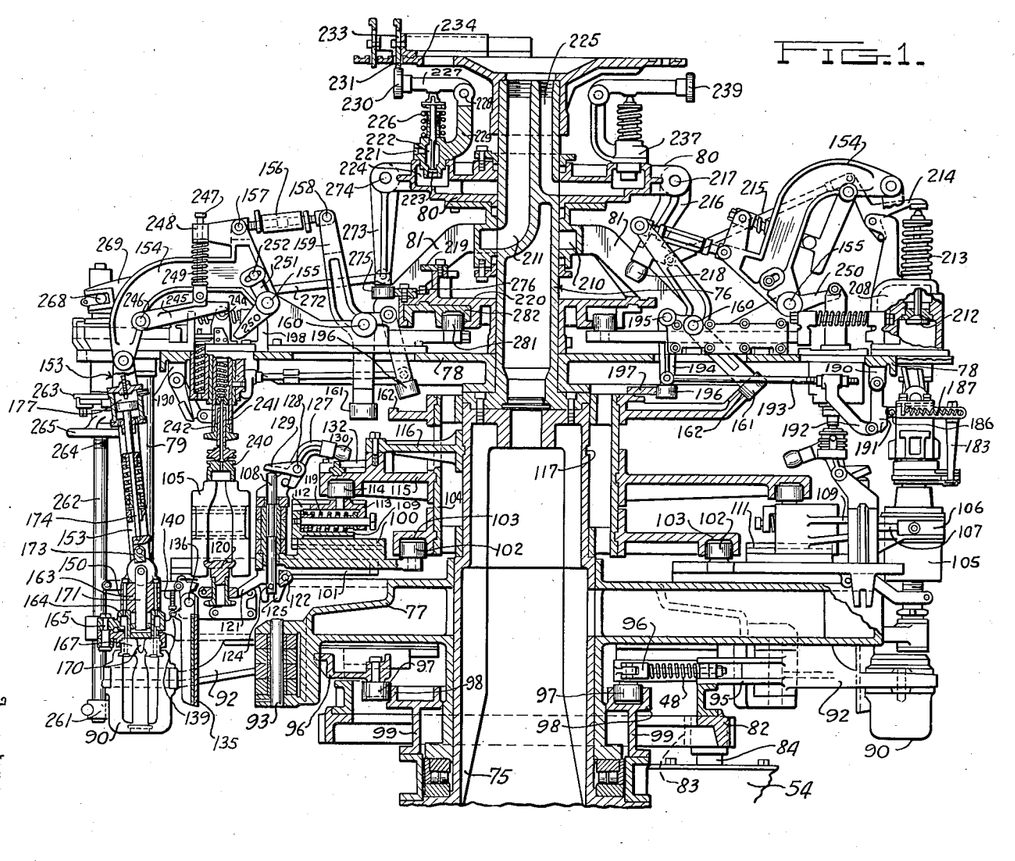
Fig. 1 is a vertical section of the turret and upper part of the supporting column, with parts removed for clearer understanding, and the right side of the section being taken at an angle to the left side of the section and broken away at various points for purposes of illustration, rather than being a true section.

Mounted underneath the outer part of spider 78, there is a bracket 190 to which is pivoted a link 191 adapted to abut against cross bar 186 when the neck ring is to be opened, as shown at the right of Fig. 1. To link 191 there is pivoted an arm 192 connected by a rod 193 to a lever 194 fulcrumed on a bracket 198 on the upper spider at 195. The lower end of lever 194 carries a cam roller 196 which is actuated by a cam 197 to open the neck ring against the tension of springs 187, as indicated at the right of Fig. 1.

The air control head 164 is provided with a channel 200 connected with a passage 201 which connects with the hollow interior of a column 79 through an opening in the side thereof. Downward passages 202 lead from passage 200 to the upper end of the neck ring. There is also a chamber 203 in the head which is connected by a passage 204 through an opening 205 with the interior 206 of the other column 79. The chamber 203 is connected by a passage 207 with the upper end of the neck mold. In this way the interior openings in the hollow column 79 are connected with the upper end of the neck ring when the neck ring is in its lower position, as shown in Fig. 10 and at the left of Fig. 1.

Figure 6:
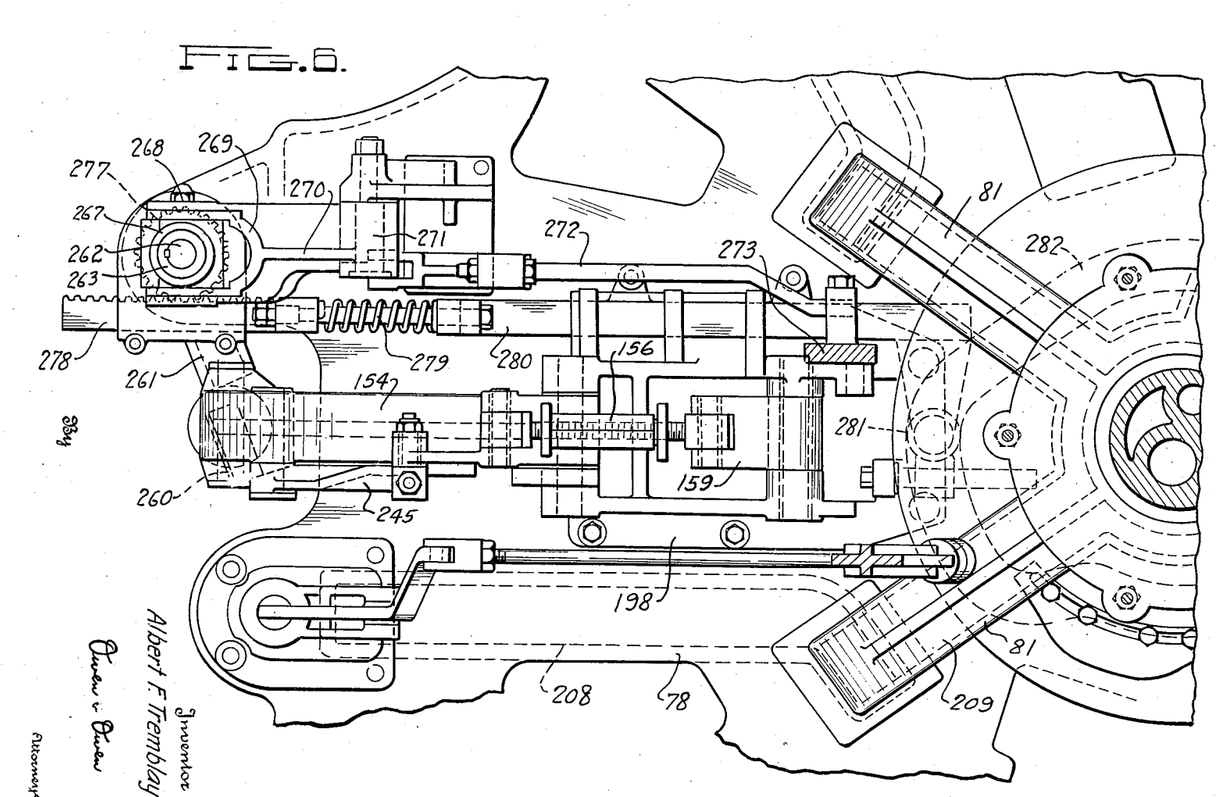
Fig. 6 is a plan view of one unit of the apparatus showing the control of the vacuum and cut-off mechanism, parts appearing in section.
Figures 7, 8:
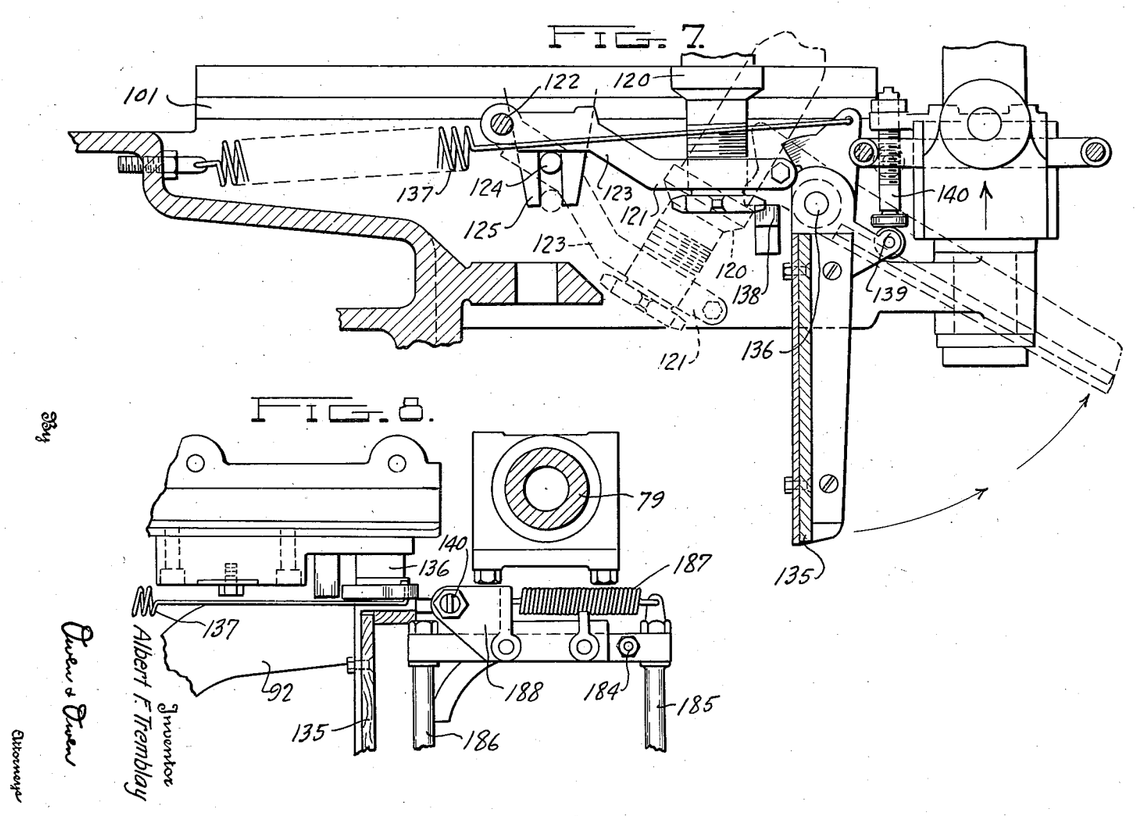
Fig. 7 is a detail section showing the operation of the tilting mold bottom and the discharge chute.
Fig. 8 is a plan view of a portion of the apparatus shown in Fig. 7, parts appearing in section.
Figure 9:
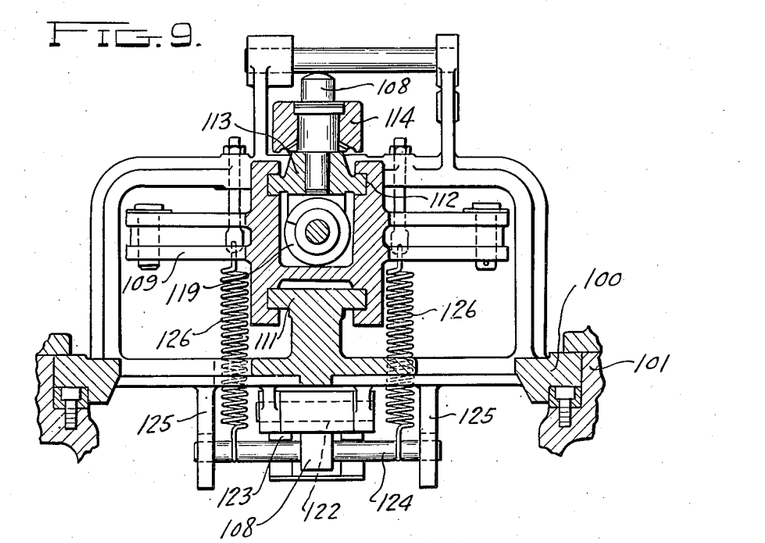
Fig. 9 is a detail view of the construction for normally raising the blow mold pivot pin, parts appearing in section.
Figure 10:
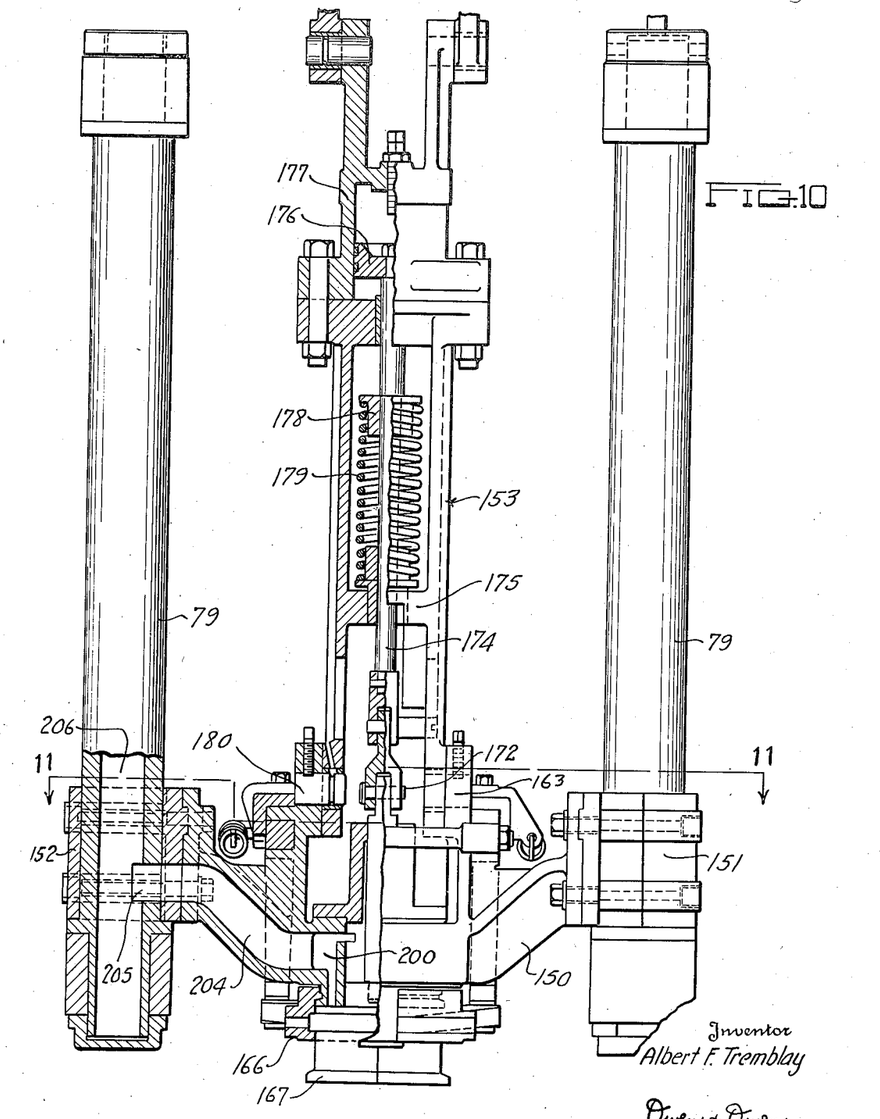
Fig. 10 is a front elevation, with parts broken away, of the neck ring supporting cross head and connected parts.
Figure 11:
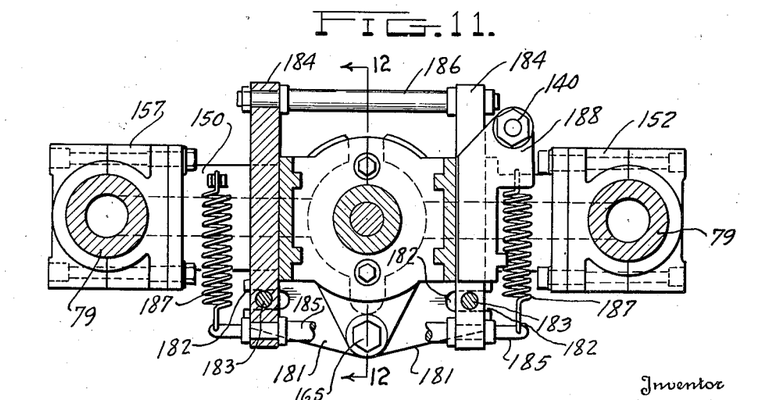
Fig. 11 is a sectional view approximately on the line 11—11 of Fig. 10.
Figure 12:
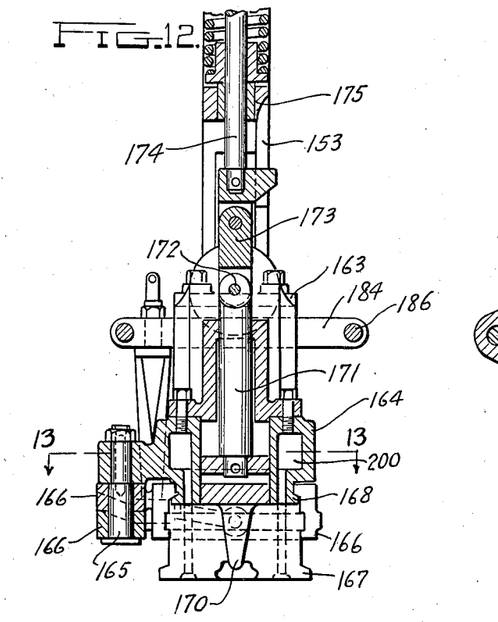
Fig. 12 is a section approximately along the line 12—12 of Fig. 11.
Figure 13:
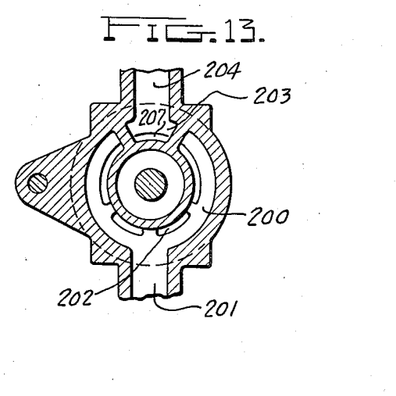
Fig. 13 is a section approximately along the line 13—13 of Fig. 12.

The column 79, shown at the right in Fig. 10 and connected with passage 201, has an opening through its upper end registering with a passage 208 in upper spider 78, as indicated in Fig. 6. Passage 208 registers with passage 209 in hollow arm 81 and thereby connects with an annular chamber 210 which is always in communication with a passage 211 in the central column portion 76 and which is connected by any suitable means with a source of vacuum.

The communication between passage 208 and the interior of the column 79 is controlled by a valve 212 which is normally held closed by a spring 213. Tappet 214 overlies the upper end of the stem of valve 212 and is actuated at suitable intervals by a link 215 connected to a lever 216 pivoted at 217 on the outer side of ring 80. The lower end of lever 216 carries a cam roller 218 in position to be actuated at suitable times by a cam 219 mounted upon the upper side of a cam plate 220 which is secured to central column 76 above spider 78.

The upper end of the hollow column shown at the left in Fig. 10 is connected by suitable means, not shown, with an opening into a valve chamber mounted on ring 80. This valve chamber, valve and operating means are not shown in detail on the drawings, but their position is indicated diagrammatically on Fig. 14, and their details are the same as those for the other air controlling valve. In the construction shown at the left of Fig. 1, there is shown an opening 221 which is connected by means, not shown, with the blow head for the blow mold, described below. This opening 221 in a valve chamber 222 communicates through valve 223 with a chamber 224 in ring 80 which in turn is supplied with air under pressure through a chamber 225 in the central column 76.

A spring 226 normally holds valve 223 in closed position. A lever 227 overlies the upper end of the stem of valve 223 and is pivoted at 228 to a bracket 229 on the valve chamber. A cam roller 230 on the outer end of lever 227 passes beneath a cam 231. This cam is preferably made up of a series of short sections 232 each mounted by a screw and slot connection 233 for vertical adjustment upon a cam carrying plate 234 mounted upon the upper end of the central column 76. By this means air under pressure is admitted to the blow head at proper times and by similar means indicated on Fig. 14, and comprising a valve chamber like 222 controlled by a valve and actuating lever similar to lever 227 having on the outer end thereof a cam roller 235 which is actuated at suitable intervals by cam members 236, similar to cam members 232, air is admitted to hollow column 79 and through the column to the neck ring at suitable times.

Figure 14:
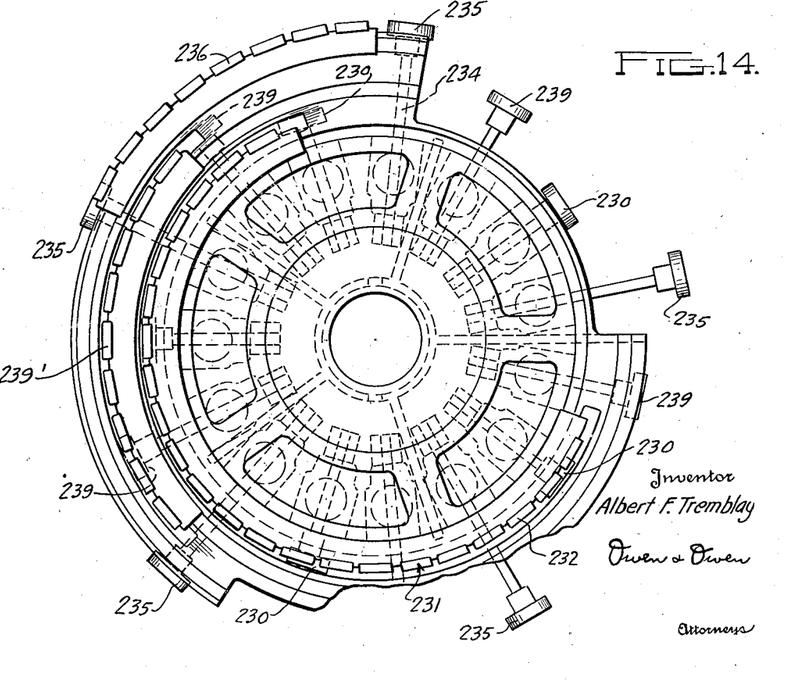
Fig. 14 is a plan view of the cams for controlling the air pressure to the various parts, the cam rollers controlled by the cams being indicated somewhat diagrammatically.

As shown at the right of Fig. 1, there is a third valve chamber 237 similar to chamber 222 and controlled by similar means including a cam roller 239 actuated by the cams 239' shown on Fig. 14. This valve chamber is connected by suitable means, not shown, with cylinder 177.

A blow head 240 is mounted to cooperate with the upper end of the blow mold at suitable times. The blow head is carried upon a rod 241 which is mounted adjustably in the lower end of a sleeve 242. The upper end of the sleeve is provided with a cam roller 244.

A lever 245 is pivoted at 246 near the outer end of lever 154 and has an actuating surface normally overlying roller 244. The inner end of lever 245 is pivoted to the lower end of a rod 247 which slides in an ear 248 on lever 154 and limits the depression of the lever. A spring 249 mounted about rod 247 normally presses the lever downward. When the outer end of the lever 154 is depressed, this connection yieldingly contacts and depresses the roller 244 and thereby the blow head.

Mounted upon pivot 155 of lever 154, there is a bell crank lever, one arm 250 of which is in position to contact the under side of roller 244 when lever 154 is raised, as shown at the right of Fig. 1. The other arm 251 of the bell crank lever has a screw and slot connection 252 with lever 154 so that the relation of arm 250 to lever 154 may be adjusted to raise the blow head at the desired time.

Means are provided for cutting off the glass from beneath the parison mold at suitable intervals. This means comprises a cut-off member 260 (see Fig. 6) which is supported by an arm 261 on the lower end of a shaft 262 (see Fig. 1). Shaft 262 is adjustably suspended from a connector sleeve 263 by means of a screw thread 264 and hand wheel 265, shaft 262 being splined in connector 263 and the hand wheel being rotatably supported by the connector so that the height of the cut-off can be adjusted by turning the hand wheel. Connector 263 has attached to its upper end a collar 267 which is above the upper spider. From collar 267 there project pins 268 sliding in grooves in the outer ends of a yoke 269 mounted on the outer end of a lever 270 fulcrumed at 271 upon a bracket on the upper spider. The other end of lever 270 is connected by means of a link 272 to a lever 273 pivoted at 274 upon ring 80 and carrying at its lower end a cam roller 275 adapted to engage a cam 276 attached to cam plate 220.

Connector 263 is splined through a gear wheel 277 mounted on the upper spider and which meshes with a rack 278 slidable radially on the apparatus. Slide 278 is connected by a yielding connection 279 with a slide 280 which carries on its bent rear end a cam roller 281 working in cam groove 282 in a cam member attached to the lower side of cam plate 220.

It will be seen that the elevation of the cutter may be adjusted at any time by hand wheel 265 and that its vertical position is controlled in timed relation with the operation of the apparatus by means of cam 276 and that the shaft is oscillated as desired by cam track 282.

The details of the cam construction have not been dwelt upon in detail, but it will be readily seen that cam drum 104 may be positioned as a whole about the central column carrying with it in adjusted relation the cams for operating the blow mold, also the cam 162 for controlling the raising and lowering of the neck ring and the blow head and the opening of the neck ring. In this way, all of the mechanism for transferring the blank to the blow mold may be adjusted about the central column without interfering with the timed relation of the various movements. At the same time, the cams for operating the various devices are each separately adjustable.

Similarly adjustment of plate 220 about the central column would carry with it adjustment of the cams for controlling the cut-off and the vacuum without disturbing the relative positions of the cams 219, 276 and 282 which are in turn separately adjustable when desired. In like manner, the top cam plate may be adjusted as a whole to position the air control cams about the central column without disturbing their relative adjustment while each of the air control cams is separately adjustable as to length, degree of opening at any one point and position relative to the other blow control cams simply by vertical adjustment of the separate sections of the controlling cams or by entire removal thereof, if desired.

The operation of the device has been indicated to some extent in connection with the description of the several portions of the apparatus, but for convenience the consecutive operations of the devices for gathering and blowing the glassware will be briefly described.

By turning handle 65, the apparatus is moved along track 22 against stops 66, which are positioned so as to insure proper relation of the apparatus to a receptacle for molten glass. Handle 65 may be used to move the apparatus away from the glass recepacle for convenience in changing molds or for any other purpose.

The length of the molds varies with the articles to be made. In all cases the mold tops must cooperate with the neck rings, so the variation in length is made at the mold bottoms. Motor 42 can be energized if necesary to raise or lower the apparatus so that the bottoms of the parison molds will dip into the surface of the molten glass and gather properly.

Figure 15:
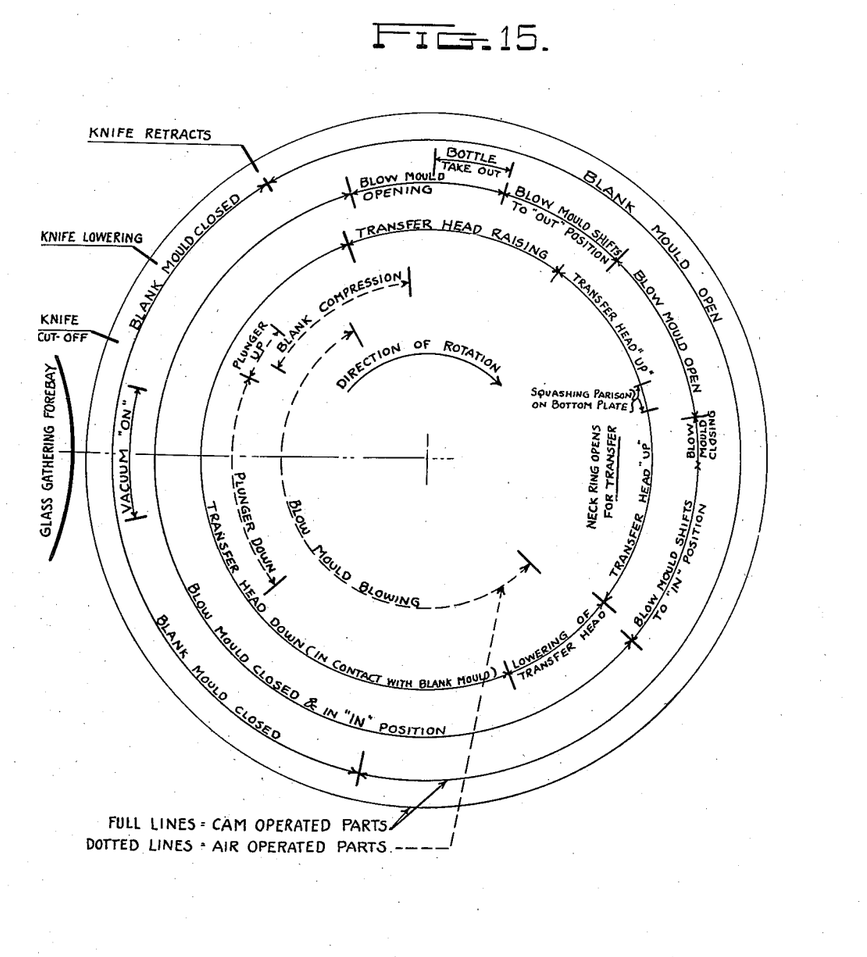
Fig. 15 is a diagram showing approximately the relative timing of the various portions of the apparatus.

The unit shown at the left of Fig. 1 is in the gathering position, or the "vacuum on" position of the diagram shown in Fig. 15. In this position, roller 218 engages cam 219, as will be readily understood, although these parts are not shown in engaged position in Fig. 1. By this means, the vacuum chamber 211 is connected with the top of the neck ring and parison mold so as to suck glass upward into the parison mold. It will be readily understood that at this time the parison in question is positioned above a suitable pool of glass, and the lower portion of cam 40 rests upon supporting ring 38 so that the base and entire apparatus mounted thereon are tilted towards the glass gathering side of the apparatus sufficiently to dip the lower end of the parison mold into the molten glass, so that a suitable charge of glass is insured. As the turret continues to revolve, and in timed relation thereto, tilting cam 40 is rotated and raises the glass gathering side of the apparatus so that the lower end of the parison mold is raised above the surface of the glass. Thereupon, the cut-off device is operated to swing across the bottom of the blank mold and cut off the glass.

In the preferred construction, as shown, the parts are proportioned so that the axis of the turret is vertical when the cam is in the position in which it is shown in Fig. 2, but the apparatus would operate similarly if the apparatus were tilted somewhat away from or toward the glass receptacle. The normal position of the axis need be only approximately vertical.

The turret continues to revolve, carrying the parison mold beyond the gathering pool and at the proper time the cam 276 lowers the cut-off knife slightly, and in timed relation therewith air is released from cylinder 177 so as to allow spring 179 to raise plunger 170 and air is admitted through the left hand column 79, as viewed in Fig. 10, to form preliminary blow opening in the blank, the cut-off knife remaining in position a slight distance below the blank so as to limit the elongation of the blank at this time.

Thereafter, the knife is retracted, the blank mold is opened and the neck ring and the cross head carrying the same are raised by cam 162.

With the blank raised and the blank mold opened, the blow mold likewise is opened. Bottom 120 is tilted by lowering of mold pin 108 so as to discharge the previously blown glass and chute 135 is swung to its outward position between the opened halves of the blank mold so as to guide the blown bottle to a position beyond the blank mold where it may be received and conveyed away in any desired manner.

After the blown bottle is discharged, the blow mold carrying slide is moved outward by cam 103 and the mold bottom is returned to its normal position. Preferably the neck ring carrying head is raised sufficiently so that the lower end of the blank is slightly above mold bottom 120 when that reaches normal position, but if desired, the apparatus might be arranged so that the bottom of the neck ring would be in line with the top of the blow mold at this time and bottom 120 would be brought up against the bottom of the blank. As stated, however, it is preferable to have the neck ring raised slightly higher than the top of the blow mold at this time and lowered just before the blow mold is closed. This squashes the bottom of the parison onto the mold bottom and facilitates proper formation of the article.

Cam 197 operates to open the neck ring as the blow mold is closed. This may be timed as desired. It is convenient to open the neck ring slightly before the completion of the closing of the blow mold so as to avoid the necessity of exact registration, but obviously the neck ring and blow mold may be accurately aligned so that the neck ring may be opened after the closing of the blow mold or just at the completion of the closing of the blow mold.

After the blow mold has closed and the neck ring has opened, the blow mold carrying slide is returned to its inner position in line beneath the blow head. Thereupon, the neck ring carrying cross head is lowered and member 245 presses the blow head down upon the blow mold. This returns the parts to the relative position in which they are shown at the left of Fig. 1, and the blowing of the article in the blow mold proceeds, being controlled by the adjustment of the cam which governs the admission of air into the blow head. It will be readily seen that the parts remain in this position until after the next blank has been sucked up into the blank mold in the manner previously described, the blow head being raised only after the next blank has been formed in the blank mold and concurrently with the raising of that blank. The blowing, however, may be stopped as soon as the blown article has set sufficiently to allow the release of the pressure. Also, it will be readily understood that the blow mold may be opened for a time, if desired, before the bottom is tilted to discharge the bottle.

Suitable means are provided for cooling the various parts and, as indicated in the drawings, the lower end of column 75 is hollow and may be supplied with cooling air, and from thence the air may be taken through the hollow lower spider for cooling purposes as desired. The exact arrangement of the cooling means may be modified as desired and as found advisable to achieve the necessary cooling of the parts in the time required.

The arrangement by which the discharge chute is held resiliently in discharge position is not only convenient because it makes possible a simple arrangement for pushing the chute back out of the way during the gathering operation, but it is also advantageous because it provides a yielding surface onto which the blown articles are dropped, thereby lessening the wear on the chute and the danger of injury to the blown articles.

While one embodiment of the invention has been shown and described in considerable detail, it will be understood that various changes may be made in the construction and arrangement of the parts within the scope of the appended claims.

What I claim is:

1. In glass forming apparatus a rotary support, a parison mold mounted to be opened and closed about a pivot stationarily mounted upon the support, means to open and close the mold about said pivot, a blow mold slidable horizontally of the support in a plane above the parison mold and between a position vertically above the parison mold and a position to one side thereof, means to form a blank in the parison mold, means to raise a formed blank from the parison mold to the approximate level of the blow mold, and means for moving the blow mold to take the blank from a position directly above the parison mold and move it to a position to one side thereof, and means to blow the blank in the blow mold at said last named position.

2. Apparatus in accordance with claim 1 and comprising means to tilt the axis of the support and thereby lower the parison to gathering position and elevate it therefrom.

3. In glass forming apparatus a rotary support carrying a plurality of sets of glass forming apparatus arranged in an annular series thereabout, each set comprising a parison mold mounted to be opened and closed about a pivot stationarily mounted upon the support, a blow mold slidable horizontally of the support in a plane above the parison mold and between a position vertically above the parison mold and a position to one side thereof, means to form a blank in the parison mold, means to raise a formed blank from the parison mold to the approximate level of the blow mold, and means for moving the blow mold to take the blank from a position directly above the parison mold and move it to a position to one side thereof, and means to blow the blank in the blow mold at said last named position.

4. In glass forming apparatus a rotary support carrying a plurality of sets of glass forming apparatus arranged in an annular series thereabout, each set comprising a parison mold mounted to remain constantly in the same horizontal plane with respect to the support, a blow mold slidable radially of the support in a plane above the parison mold and between a position vertically above the parison mold and a position to one side thereof, means to form a blank in the parison mold, means to raise a formed blank from the parison mold to the approximate level of the blow mold, and means for moving the blow mold to take the blank from said raised position and move it to a position to one side thereof.

5. Apparatus in accordance with claim 3 and in which said last named position is nearer the axis of the rotary support than are the blank molds.

6. In apparatus for forming glass, a blank mold, a blow mold slidably mounted in a plane above the blank mold and movable from a position directly over the blank mold to a position at one side thereof, a neck ring, means to move the neck ring from a position on the blank mold to a position above the level of the blow mold, said blow mold comprising sides and a bottom, means to position the opened blow mold with its bottom beneath the blank suspended from the neck ring, means to thereafter lower the neck ring towards the blow mold bottom, means to close the blow mold about the blank and open the neck ring, means to move the blow mold with the blank therein to one side of the position of the neck mold, and means to blow the blank in the mold in the last said position.

7. Apparatus in accordance with claim 6 and having operating means timed to open the neck ring before the blow mold is completely closed.

8. Apparatus for forming glassware comprising a parison mold having openable sides, a blow mold having a blowing position above and to one side of the parison mold, and provided with discharge means, a neck ring carrier movable vertically above the blank mold from a position with the neck ring fitting on the blank mold to a position holding the neck ring higher than the top of the blow mold, and operating means timed to open the blank mold, raise the neck ring with the blank therein, and discharge a previously blown article beneath the blank and between the opened sides of the blank mold.

9. Apparatus in accordance with claim 8, and said discharge means comprising a chute pivoted near the bottom of the blow mold and means for swinging the chute between an outwardly slanting discharge position and a vertical inactive position.

10. Apparatus in accordance with claim 8 and said discharge means comprising a chute movable between an active position and a discharge position, and means determining the position of the chute by the movement of the blank raising means.

11. Apparatus in accordance with claim 8, and the discharge means comprising a chute pivoted near the bottom of the blow mold, a spring normally urging the chute to a slanting position, and an abutment on the neck ring carrier swinging the chute to a vertical inactive position at one side of the blank mold when the carrier is lowered.

12. Apparatus in accordance with claim 8 and the discharge means comprising a pivoted carrier for the mold bottom tiltable to discharge a blown article.

13. Apparatus in accordance with claim 8 and the discharge means comprising a chute pivoted near the mold bottom and a pivoted carrier for the mold bottom, said carrier and chute being associated to discharge a blown article from the mold bottom onto and along the chute.

14. In glass forming apparatus, a rotary mold support, a mold on the support, means to open the mold and discharge a formed article from the side of the mold away from the axis of the support, and a resiliently supported chute mounted on said rotary support in position to receive the discharged article and guide it downwardly and outwardly from the axis of the support.

15. In glass forming apparatus, a rotary support, a series of molds mounted on said support, means to open said molds in succession and discharge formed articles in a direction away from the axis of the support, and a chute pivotally mounted upon the support beneath each mold and adapted to guide the discharged article away from the axis of the support.

16. In glass forming apparatus, a rotary support, a mold on the support, means to open the mold and discharge an article formed therein in a direction away from the axis of the support, other apparatus employed in the forming of the glass and mounted on the support so as to extend away from the axis of the support farther than the discharge side of said mold, and a chute in position to receive the discharged article and guide it to a point beyond the path of said other apparatus.

17. Apparatus in accordance with claim 16 and comprising an annular series of said molds, and a chute mounted on the support beneath each of said molds.

18. A blow mold having sides mounted upon a vertical pivot and a bottom mounted upon a horizontal pivot, means to move said vertical pivot vertically and means determining the position of the mold bottom by the position of said vertical pivot.

19. Apparatus in accordance with claim 18 and comprising resilient means normally raising said vertical pivot and mechanical means for positively lowering said vertical pivot.

20. Apparatus in accordance with claim 18, and the lower end of said vertical pin carrying a cross member upon which the pivoted carrier of the mold bottom rests.

21. In glass apparatus, a blow mold comprising horizontally movable sides and a bottom tiltable by vertical oscillation, a pivot pin about which the mold sides oscillate, connections between the pivot pin and the mold bottom controlling the oscillation of the mold bottom, and means for moving said pivot pin longitudinally to control the oscillation of the mold bottom.

22. In glass forming apparatus, a blow mold comprising sides mounted upon a vertical pivot pin for opening and closing movement, a cross piece on the lower end of said pivot pin, a mold bottom mounted upon arms resting on said cross piece, springs normally raising the cross piece, and means for forcing the pivot pin downward and thereby allowing the mold bottom to move downward at desired intervals.

23. Apparatus for forming glassware comprising a rotatable support, a plurality of sets of glass forming apparatus upon said support, each set comprising a blank mold, a blow mold mounted in a plane higher than the blank mold and normally in a position nearer the axis of the support than the blank mold, means to form a blank in the blank mold, means to open the blank mold, means to raise the formed blank from the blank mold to a level as high as the blow mold, and means to discharge a previously blown article from the blow mold downward and outward beneath the raised blank and between the opened sides of the blank mold.

24. Apparatus for forming glassware comprising a blank mold, a neck ring, a neck ring carrier movable vertically above the blank mold, a blow mold having a blowing position above and at one side of the blank mold, and means to transfer the blank from a position vertically above the blank mold to the blowing position.

25. Apparatus for forming glassware comprising a blank mold, a neck ring, a neck ring carrier movable vertically over said mold, a blow mold slidable horizontally between a position vertically above the blank mold and a blowing position at one side thereof, and means operating said parts in timed relation to lift the blank higher than blowing position, move the blow mold ti its position vertically above the blank mold, thereafter lower the blank into registry with the blow mold, close the blow mold, and return it to blowing position.

26. In apparatus for forming glassware, a blank mold, a neck ring, two vertical columns above and out of alignment with the blank mold, a neck ring carrier slidable on said columns, and means to supply air to the neck ring through the carrier and one of said columns at a pressure greater than atmospheric and through the other of said columns at a pressure less than atmospheric.

27. In apparatus for forming glassware, a blank mold, a neck ring, two vertical columns above and out of alignment with the blank mold, a neck ring carrier slidable on said columns, and means to supply air to the neck ring through the carrier and one of said columns at a pressure greater than atmospheric.

28. In apparatus for forming glassware, a blank mold, a neck ring, two vertical columns above and out of alignment with the blank mold, a neck ring carrier slidable on said columns, and means to supply air to the neck ring through the carrier and one of said columns at a pressure less than atmospheric.

29. Apparatus in accordance with claim 26 and comprising valves controlling the admission of said pressure, and means operating in timed relation to control said valves.

30. In apparatus for forming glassware, a blank mold, a neck ring, a neck ring carrier, a link connecting the carrier with a lever for raising and lowering the carrier, a plunger movable into and out of the neck ring, and means carried by the link for moving said plunger.

31. Apparatus in accordance with claim 30 and in which said plunger-moving means is fluid operated.

32. Apparatus in accordance with claim 30 and the plunger operating means comprising a rod movable longitudinally of the link and pivoted to the plunger, said pivot being substantially in line with the pivot of the link to the carrier when the plunger is lowered.

33. Glass forming apparatus comprising a a blank mold, a neck ring, a vertically movable neck ring carrier, a blow mold above and normally out of alignment with the blank mold, a blow head above and in vertical alignment with the normal position of the blow mold, means for raising and lowering the neck ring carrier and means operated by the raising and lowering of the neck ring carrier to raise and lower the blow head above the blow mold.

34. A glass forming apparatus comprising a blank mold, a neck ring, a vertically movable neck ring carrier, a blow mold above and normally out of alignment with the blank mold, a blow head above the normal position of the blow mold, and means for raising and lowering the neck ring carrier comprising a lever and adjustable members carried by the lever and adapted to raise and lower the blow head above the blow mold.

35. A glass forming apparatus comprising a blank mold, a neck ring, a vertically movable neck ring carrier, a blow mold above and normally out of alignment with the blank mold, a blow head above the normal position of the blow mold, and means for raising and lowering the neck ring carrier comprising a lever, a member adjustably mounted upon the lever to lower said blow head when the neck ring is lowered to the desired extent and another member adjustably mounted upon said lever to raise said blow head when the neck ring is raised to the desired extent.

36. Glass apparatus comprising a central column provided with vacuum and pressure chambers, forming apparatus rotatable about the column and connected through valves to said chambers, a horizontal cam plate mounted on the column and carrying a plurality of cams, each cam comprising a plurality of sections separately adjustable vertically, and means actuated by said cams and controlling said valves in accordance with the vertical positions of said sections.

37. In glass forming apparatus, a neck ring carrier, a partible neck ring, the parts of which are pivoted upon a vertical axis mounted on the carrier, resilient means mounted on the carrier normally closing the neck ring and a horizontally slidable member mounted on the carrier and connected to the neck ring to open the same.

38. In glass forming apparatus a blank forming mold, a neck ring, a neck ring carrier movable towards and from the blank mold to place the neck ring in cooperative relation with the blank mold and remove the neck ring with the blank therein from the blank mold, a blow mold and means to move the blow mold to and from the neck ring when the neck ring is moved away from the blank mold, and means slidable on the carrier in the direction of movement of the blow mold towards the neck ring for opening the neck ring.

39. Glass forming apparatus comprising a rotary turret, a plurality of glass forming units mounted in an annular series on said turret, each unit comprising a blank mold, a blow mold slidable radially of the turret in a plane above the blank mold and to and from a position vertically above the blank mold, a neck ring, a neck ring carrier movable vertically to carry the neck ring from cooperative position with the blank mold to a position where it may cooperate with the blow mold, a slide on said carrier movable away from the axis of the turret to open the neck ring, and means to move said slide to open the neck ring and deliver the blank to the blow mold.

40. Apparatus for forming glass comprising a rotary turret, a plurality of glass forming units mounted in an annular series on said turret, each unit comprising a blank mold, a blow mold and means for transferring a blank from the blank mold to the blow mold, said turret being adapted to be positioned adjacent a supply of molten glass, and means to tilt the turret as each blank mold in succession arrives above the molten glass to dip the lower end of the blank mold into the glass and then to lift it above the glass to pass over the edges of the glass receptacle.

41. Apparatus for gathering glass comprising a glass gathering device rotatable about a substantially vertical axis and adapted to be moved over a receptacle containing molten glass at one point in its rotary travel and means for tilting the entire apparatus so as to move its top towards the glass receptacle each time the gathering device is over the receptacle, and thereafter return the device to its original position.

42. Apparatus for gathering glass comprising a plurality of glass gathering devices rotatable about a substantially vertical axis and adapted to be moved in succession over a receptacle containing molten glass at one point in their rotary travel and means for tilting the entire apparatus so as to incline the top of the vertical axis towards the glass receptacle each time a gathering device is over the receptacle, and thereafter return the device to its original position with its axis vertical.

43. In combination, a support, means to rotate the support about a substantially vertical axis, a glass gathering device mounted on the support and adapted to move over a receptacle for molten glass during the rotary movement of the support, means to oscillate the support about a horizontal axis, and means coordinating the means for rotating the support and means for oscillating the support to lower the side of the support towards the receptacle each time the gathering device is over the receptacle and to raise the device as it passes from the receptacle.

44. In combination, a support, means to rotate the support about a substantially vertical axis, a plurality of glass gathering devices mounted on the support in an annular series about said axis, means to oscillate the support about a horizontal axis, and means coordinating the oscillation of the support with its rotation whereby the support is given as many complete oscillations during one rotation as there are gathering devices in said annular series.

45. A glass forming device comprising a wheeled carrier, levers fulcrumed on the ends of the carrier and extending towards the middle thereof, means mounted on the middle of the carrier to adjustably support the adjacent ends of the levers, and a base for the glass forming apparatus mounted upon said levers between said fulcrums and said adjacent ends.

46. A glass forming device comprising a wheeled carrier, levers mounted on the ends of the carrier and extending towards the middle thereof, means mounted on the middle of the carrier to adjustably support the adjacent ends of the levers, a base for the glass forming apparatus mounted upon said levers, and means for raising and lowering one side of the base with respect to the lever whereon it rests.

47. A glass forming device comprising a wheeled carrier, levers mounted on the ends of the carrier and extending towards the middle thereof, means mounted on the middle of the carrier to adjustably support the adjacent ends of the levers, a base for the glass forming apparatus mounted upon said levers, and a cam interposed between the base and one of said levers and rotatable to raise and lower that side of the base with respect to the lever.

48. Apparatus in accordance with claim 45, said glass apparatus comprising a rotatable carrier supporting glass gathering devices, a cam interposed between one side of the base and the supporting lever, and means for rotating said cam in timed relation with the rotation of the carrier to dip the glass gathering devices in succession as they pass a given point.

49. Glass apparatus comprising a central column provided with a chamber for air under pressure other than atmospheric, forming apparatus rotatable about the column and connected through valves to said chamber, a horizontal cam plate mounted on the column and carrying a plurality of cams, each cam comprising a plurality of sections separately adjustable vertically, and means actuated by said cams and controlling said valves in accordance with the vertical positions of said sections.

ALBERT F. TREMBLAY.